(12) United States Patent  
Kriegsman et al.

(10) Patent No.: US 9,286,063 B2  
(45) Date of Patent: Mar. 15, 2016

(54) METHODS AND SYSTEMS FOR PROVIDING FEEDBACK AND SUGGESTED PROGRAMMING METHODS

(71) Applicant: Veracode, Inc., Burlington, MA (US)

(72) Inventors: Mark Kriegsman, Arlington, MA (US); Brian Black, Bellingham, WA (US)

(73) Assignee: Veracode, Inc., Burlington, MA (US)

( * ) Notice: Subject to any disclaimer, the term of this patent is extended or adjusted under 35 U.S.C. 154(b) by 0 days.

(21) Appl. No.: 13/770,487

(22) Filed: Feb. 19, 2013

(65) Prior Publication Data

US 2013/0227516 A1  Aug. 29, 2013

Related U.S. Application Data

(60) Provisional application No. 61/601,720, filed on Feb. 22, 2012.

(51) Int. Cl.
  *G06F 9/44* (2006.01)
  *G06F 11/36* (2006.01)

(52) U.S. Cl.
  CPC .............. *G06F 8/77* (2013.01); *G06F 11/3604* (2013.01); *G06F 11/3668* (2013.01)

(58) Field of Classification Search
  None
  See application file for complete search history.

(56) References Cited

U.S. PATENT DOCUMENTS

| | | |
|---|---|---|
| 4,527,237 A | 7/1985 | Frieder et al. |
| 4,533,997 A | 8/1985 | Furgerson |
| 4,931,928 A | 6/1990 | Greenfeld |
| 5,263,162 A | 11/1993 | Lundeby |
| 5,325,531 A | 6/1994 | McKeeman et al. |
| 5,432,942 A | 7/1995 | Trainer |
| 5,481,708 A | 1/1996 | Kukol |
| 5,586,328 A | 12/1996 | Caron et al. |

(Continued)

FOREIGN PATENT DOCUMENTS

| | | |
|---|---|---|
| WO | WO-0186427 A2 | 11/2001 |
| WO | WO-2004003706 A2 | 1/2004 |

(Continued)

OTHER PUBLICATIONS

Ahpah Software, Inc. SourceAain and Java Decompilation—Updated Dec. 9, 2001. White Paper: SourceAgain and Java Decompilation retrieved from http://www.ahpah.com/whitepaper.html on Dec. 4, 2002.

(Continued)

*Primary Examiner* — Wei Zhen
*Assistant Examiner* — Hossain Morshed
(74) *Attorney, Agent, or Firm* — Goodwin Procter LLP (57) ABSTRACT

The techniques and supporting systems described herein provide a comprehensive and customizable approach to identifying the use of best practices during the design and development of software applications, as well as recommending additional enhancements or courses of action that may be implemented to further improve the application. Target software application code is received specific application security best practices applicable to the target software application are identified. Locations in the code where the various best practices ought to be implemented are then identified, and a determination is made whether the relevant best practices are implemented for each location. Finally, positive feedback is provided to the developers for what appears to be their correct implementation of best practices.

34 Claims, 2 Drawing Sheets

(56) References Cited

U.S. PATENT DOCUMENTS

| | | |
|---|---|---|
| 5,590,330 A | 12/1996 | Coskun et al. |
| 5,715,403 A | 2/1998 | Stefik |
| 5,793,374 A | 8/1998 | Guenter et al. |
| 5,812,851 A | 9/1998 | Levy et al. |
| 5,819,097 A | 10/1998 | Brooks et al. |
| 5,854,924 A | 12/1998 | Rickel et al. |
| 5,854,929 A | 12/1998 | Van Praet et al. |
| 5,862,382 A | 1/1999 | Kataoka |
| 5,864,871 A | 1/1999 | Kitain et al. |
| 5,875,334 A | 2/1999 | Chow et al. |
| 5,881,290 A | 3/1999 | Ansari et al. |
| 5,892,900 A | 4/1999 | Ginter et al. |
| 5,918,035 A | 6/1999 | Van Praet et al. |
| 5,933,635 A | 8/1999 | Holzle et al. |
| 5,937,190 A | 8/1999 | Gregory et al. |
| 5,937,192 A | 8/1999 | Martin |
| 6,009,256 A | 12/1999 | Tseng et al. |
| 6,014,518 A | 1/2000 | Steensgaard |
| 6,026,485 A | 2/2000 | O'Connor et al. |
| 6,064,819 A | 5/2000 | Franssen et al. |
| 6,071,317 A | 6/2000 | Nagel |
| 6,078,745 A | 6/2000 | De Greef et al. |
| 6,125,439 A | 9/2000 | Tremblay et al. |
| 6,151,701 A | 11/2000 | Humphreys et al. |
| 6,151,706 A | 11/2000 | Lo et al. |
| 6,154,876 A | 11/2000 | Haley et al. |
| 6,175,948 B1 | 1/2001 | Miller et al. |
| 6,240,376 B1 | 5/2001 | Raynaud et al. |
| 6,240,547 B1 | 5/2001 | Holzle et al. |
| 6,243,848 B1 | 6/2001 | Guignet et al. |
| 6,249,910 B1 | 6/2001 | Ju et al. |
| 6,311,327 B1 | 10/2001 | O'Brien et al. |
| 6,336,087 B2 | 1/2002 | Burgun et al. |
| 6,381,738 B1 | 4/2002 | Choi et al. |
| 6,412,106 B1 | 6/2002 | Leask et al. |
| 6,457,172 B1 | 9/2002 | Carmichael et al. |
| 6,594,761 B1 | 7/2003 | Chow et al. |
| 6,601,235 B1 | 7/2003 | Holzle et al. |
| 6,609,128 B1 * | 8/2003 | Underwood ............ G06F 9/4448 707/610 |
| 6,631,473 B2 * | 10/2003 | Townsend ............ G06F 21/577 726/23 |
| 6,668,325 B1 | 12/2003 | Collberg et al. |
| 6,766,481 B2 | 7/2004 | Estep et al. |
| 6,779,114 B1 | 8/2004 | Gu et al. |
| 6,820,256 B2 * | 11/2004 | Fleehart ............ G06F 11/3608 714/E11.218 |
| 6,892,303 B2 | 5/2005 | Le Pennec et al. |
| 6,925,638 B1 | 8/2005 | Koved et al. |
| 6,928,638 B2 | 8/2005 | Parvathala et al. |
| 6,961,925 B2 | 11/2005 | Callahan, II et al. |
| 6,980,927 B2 * | 12/2005 | Tracy ............ G06F 21/577 702/181 |
| 7,051,322 B2 | 5/2006 | Rioux |
| 7,089,590 B2 | 8/2006 | Judge et al. |
| 7,140,008 B2 | 11/2006 | Chilimbi et al. |
| 7,155,708 B2 | 12/2006 | Hammes et al. |
| 7,162,473 B2 | 1/2007 | Dumais et al. |
| 7,171,655 B2 | 1/2007 | Gordon et al. |
| 7,185,323 B2 | 2/2007 | Nair et al. |
| 7,266,813 B2 | 9/2007 | Nistler et al. |
| 7,284,274 B1 * | 10/2007 | Walls ............ G06F 8/70 726/22 |
| 7,315,903 B1 | 1/2008 | Bowden |
| 7,376,939 B1 | 5/2008 | Nayak et al. |
| 7,389,208 B1 * | 6/2008 | Solinsky ............ G06K 9/6232 382/115 |
| 7,430,670 B1 | 9/2008 | Horning et al. |
| 7,437,764 B1 | 10/2008 | Sobel et al. |
| 7,458,067 B1 | 11/2008 | Tirumalai et al. |
| 7,548,946 B1 | 6/2009 | Saulpaugh et al. |
| 7,594,269 B2 | 9/2009 | Durham et al. |
| 7,707,566 B2 | 4/2010 | Grover et al. |
| 7,743,336 B2 | 6/2010 | Louch et al. |
| 7,752,609 B2 | 7/2010 | Rioux |
| 7,779,394 B2 | 8/2010 | Horning et al. |
| 7,779,472 B1 | 8/2010 | Lou |
| 7,840,845 B2 | 11/2010 | Doddapaneni et al. |
| 7,840,951 B1 | 11/2010 | Wright et al. |
| 7,856,624 B2 | 12/2010 | Plum |
| 7,874,001 B2 | 1/2011 | Beck et al. |
| 7,891,003 B2 | 2/2011 | Mir et al. |
| 7,930,753 B2 | 4/2011 | Mellinger et al. |
| 7,937,693 B2 | 5/2011 | Victorov |
| 8,069,487 B2 | 11/2011 | Fanton et al. |
| 8,087,067 B2 | 12/2011 | Mahaffey et al. |
| 8,108,933 B2 | 1/2012 | Mahaffey |
| 8,136,104 B2 | 3/2012 | Papakipos et al. |
| 8,161,464 B2 | 4/2012 | Archambault et al. |
| 8,161,548 B1 | 4/2012 | Wan |
| 8,171,553 B2 | 5/2012 | Aziz et al. |
| 8,181,251 B2 | 5/2012 | Kennedy |
| 8,225,409 B2 | 7/2012 | Newman et al. |
| 8,272,058 B2 | 9/2012 | Brennan |
| 8,281,290 B2 | 10/2012 | Thompson |
| 8,290,245 B2 | 10/2012 | Turbell et al. |
| 8,332,944 B2 | 12/2012 | Rozenberg et al. |
| 8,347,386 B2 | 1/2013 | Mahaffey et al. |
| 8,365,155 B2 | 1/2013 | Rioux |
| 8,819,772 B2 * | 8/2014 | Bettini ............ H04L 63/0227 709/219 |
| 2005/0108037 A1 | 5/2005 | Bhimani et al. |
| 2005/0138426 A1 | 6/2005 | Styslinger |
| 2006/0136424 A1 | 6/2006 | Nuggehalli et al. |
| 2006/0277607 A1 | 12/2006 | Chung |
| 2007/0180490 A1 | 8/2007 | Renzi et al. |
| 2007/0240218 A1 | 10/2007 | Tuvell et al. |
| 2007/0261061 A1 | 11/2007 | Staniford et al. |
| 2008/0209567 A1 | 8/2008 | Lockhart et al. |
| 2009/0165135 A1 | 6/2009 | Lomont et al. |
| 2010/0031353 A1 | 2/2010 | Thomas et al. |
| 2010/0058474 A1 | 3/2010 | Hicks |
| 2010/0058475 A1 | 3/2010 | Thummalapenta et al. |
| 2010/0281248 A1 * | 11/2010 | Lockhart ............ G06F 11/3612 713/150 |
| 2011/0047594 A1 | 2/2011 | Mahaffey et al. |
| 2011/0145920 A1 | 6/2011 | Mahaffey et al. |
| 2011/0173693 A1 * | 7/2011 | Wysopal ............ G06F 11/3612 726/19 |
| 2012/0072968 A1 * | 3/2012 | Wysopal ............ G06F 11/3612 726/1 |
| 2012/0117650 A1 | 5/2012 | Nachenberg |
| 2012/0174224 A1 | 7/2012 | Thomas et al. |
| 2013/0097706 A1 * | 4/2013 | Titonis ............ G06F 21/56 726/24 |

FOREIGN PATENT DOCUMENTS

| | | |
|---|---|---|
| WO | WO-2008103286 A2 | 8/2008 |
| WO | WO-2009097610 A1 | 8/2009 |

OTHER PUBLICATIONS

Ahpah Software, Inc. SourceAgain PC Professional, Ahpah Software, Inc. / SourceAgain PC Professional retrieved from http://www.ahpah.com/sourceagain/sourceagain.sub.--professional.html on Dec. 4, 2002.

Backer Street Software. REC—Reverse Engineering Compiler. REC Decompiler Home Page retrieved from http://www.backerstreet.com/rec/rec.htm on Dec. 3, 2002.

Blume, W. & Eigenmann, R., "Demand-driven Symbolic Range Propagation", University of Illinois Urbana-Champaign, 1-15 (1995).

Blume, W.J., "Symbolic Analysis Techniques for Effective Automatic Parallelization", University of Illinois at Urbana-Champaign (1995).

Bohme, Rainer "A Comparison of Market Approaches to Software Vulnerability Disclosure", Springer-Verlag Berlin Heidelberg, 2006 (14 pages).

Breuer et al, "Decompilation: The enumeration of types and grammars", ACM Trans. on Prog. Lang. and Sys. vo. 16, No. 5, pp. 1613-1647, 1994.

(56) References Cited

OTHER PUBLICATIONS

Breuer, P.T. and Bown, J.P., (1992d), "Generating Decompilers", Draft, Oxford University Computing Laboratory. Submitted for Publication.

Burke, "An interval based approach to exaustive and incremental interprocedural data flow analysis", ACM Trans. on Prog. Language and Systems, vol. 12, No. 3, pp. 341-395, 1990.

Business Wire, "The Kernel Group Unveils Java Support for AutoTracel Serviceability Solution Expands Capabilities; Provides Java Support and Key Features that Extend its Power and Flexibility", Jun. 4, 2001.

Choi, J.D. & Ferrante, J., "Static Slicing in the Presence of GOTO Statements", IBM T.J. Watson Research Center.

Cifuentes, C., "An Environment for the Reverse Engineering of Executable Programs", Proceedings of the Asia-Pacific Software Engineering Conference (APSEC), IEEE Computer Society Press, Brisbane, Australia, pp. 41-419, Dec. 1995.

Cifuentes, C., "Partial Automation of an Integrated Reverse Engineering Environment of Binary Code", Proceedings Third Working Conference on Reverse Engineering, Monterey, CA, IEEE-CS Press, pp. 50-56, Nov. 8-10, 1996.

Cifuentes, C., "Reverse Compilation Techniques", Queensland University of Technology (Jul. 1994).

Cifuentes, C. et al., "Assembly to High-Level Language Translation", University of Queensland, Brisbane, Australia, Dept. of Comp. Sci. & Elec. Eng., Technical Report 439, Aug. 1993.

Cifuentes, C. et al., "The Design of a Resourceable and Retargetable Binary Translator", University of Queensland, Dept. Comp. Sci. & Elec. Eng. & Ramsey, N., University of Virginia, Dept. Comp. Sci.

Cifuentes, C. & Fraboulet, A., "Intraprocedural Static Slicing of Binary Executables", University of Queensland, Dept. Comp. Sci., Centre for Software Maintenance.

Cifuentes, C. & Gough, K.J., "Decompilation of Binary Programs", Software—Practice and Experience, vol. 25, pp. 811-829, Jul. 1995.

Cifuentes, C. & Sendall, S., "Specifying the Semantics of Machine Instructions", University of Queensland, Dept. Comp. Sci. & Elec. Eng., Technical Report 442, Dec. 1997.

Cifuentes, C. & Simon, D., "Precedural Abstration Recovery from Binary Code", University of Queensland, Dept. Comp. Sci. & Elec. Eng., Technical Report 448, Sep. 1999.

Cifuentes, C. & Van Emmerik, M., "Recovery of Jump Table Case Statements from Binary Code", University of Queensland, Dept. Comp. Sci. & Elec. Eng., Technical Report 444, Dec. 1998.

Cytron, R. et al., "Efficiently Computing Static Single Assignment Form and the Control Dependence Graph", IBM Research Division, Mar. 7, 1991.

Dejean et al, "A definition optimization technique used in a code translation algorithm", Comm.. of the ACM, vol. 32, No. 1, pp. 94-105, 1989.

Di Lucca Guiseppe A., et al. "Testing Web-based applications: The state of the art and future trends" Information and Software Technology, 2006 (pp. 1172-1186).

Duesterwald et al, "A demand driven analyzer for data flow testing at the integration level", IEEE ICSE, pp. 575-584, 1996.

Duesterwald, E. et al., "A Practical Framework for Demand-Driven Interprocedural Data Flow Analysis", ACM Transactions on Programming Languages and Systems 19, pp. 992-1030, Nov. 1997.

Dyer, D. Java decompilers compared ; Our detailed examples of how 3 top decompilers handle an extensive test suite will help you determine which, if any, meet your needs. JavaWorld (Jul. 1997).

Gough, I., Queensland University of Technology & Klaeren, H., University of Tubingen, "Eliminating Range Checks using Static Single Assignment Form", Dec. 19, 1994.

Gupta, R., University of Pittsburgh, "Optimizing Array Bound Checks Using Flow Analysis", ACM SIGPLAN Conference on Programming Language Design and Implementation, White Plains, NY, Preliminary Version (1995).

Harrold, M.J. & Soffa, M.L., "Efficient Computation of Interprocedural Definition-Use Chains", ACM Transactions on Programming Language and Systems 16, 175-204 (Mar. 1994).

Hollingum, J., "Arithmetic robot modules control robotic production", Industrial Robot 22, 32-35 (1995).

International Search Report for PCT/US2008/002025, mailing date Sep. 2, 2008 ( 4 pages).

Kumar, S., "DisC—Decompiler for TurboC": http://www.debugmode.com/dcompile/disc.htm modified Oct. 22, 2001.

Liang, D. & Harrold, M.J., "Efficient Computation of Parameterized Pointer Information for Interprocedural Analyses", Georgia Institute of Technology, Tech Report GIT-CC-00-35, 1-17 (Dec. 2000).

Liang, D. & Harrold, M.J., "Light-Weight Context Recovery for Efficient and Accurate Program Analyses", Proceedings of the 22nd International Conference on Software Engineering 1-10 (Jun. 2000).

MacUser, Programming & systems; Software Review; software for the Apple Macintosh computer, Evaluation, vol. 8, 237 (Jan. 1993).

Mittal et al, "Automatic translation of software binaries onto FPGAs", ACM DAC, pp. 389-394, 2004.

Mycroft, A., "Type-Based Decompilation", Cambridge University, Computer Laboratory.

Myreen et al, "Machine code verification for multiple architectures" IEEE, pp. 1-8, 2008.

Orso, A. et al., "Effects of Pointers on Data Dependences", Georgia Institute of Technology, College of Computing, Technical Report GIT-VV-00-33, 1-17 (Dec. 2000).

Partial International Search Report for EP12184590.3 dated May 10, 2013, 7 pages.

Patterson, J.R.C., "Accurate Static Branch Prediction by Value Range Propagation", Proc. ACM SIGPLAN Conference on Programming Language and Design Implementation, La Jolla, San Diego, 67-78 (Jun. 1995).

Pingali, K. & Bilardi G., "Optimal Control Dependence Computation and the Roman-Chariots Problem", ACM Transactions on Programming Languages and Systems 19, 1-30 (May 1997).

Reilly, D., "Decompilers—friend or foe?", Java Coffee Break updaed Jun. 2, 2001 retrieved from http://www.javacoffeebreak.com/articles/decompilers.sub.--friend.sub.--or- .sub.--foe.html.

Sagiv, M. et al. Precise Interprocedure Dataflow Analysis with Applications to Constant Propagation. University of Wisconsin-Madison, Computer Sciences Dept.

Saul, J. M. Hardware/Software Codesign fir FPGA-Based Systems. Proceedings of the 32.sup.nd Hawaii International Conference on System Sciences (1999).

Sinha, S. & Harold, M.J., "Analysis and Testing of Programs with Exception-Handling Constructs", IEEE Transactions on Software Eng. 26, 1-24 (Sep. 2000).

Stitt et al, "New decompilation techniques for binary level co-processor generation", IEEE, pp. 546-553, 2005.

University of Queensland, Comp. Sci & Elec. Eng., The dcc Decompiler, updated on May 4, 2002, retrieved from http://itee.uq.edu.au/.about.cristina/dcc.html on Dec. 4, 2002.

Ural et al, "Modeing software for acurate data flow representaion", IEEE, pp. 277-286, 1993.

Van Emmerik, M. Signatures for Library Functions in Executable Files. Queensland University of Technology, Information Security Research Centre.

Van Tyle, S., "Engineering software tools meet demands", Electronic Design 42, 71 (Jun. 27, 1994).

Written Opinion of the International Searching Authority for PCT/US2008/002025 mailing date Sep. 2, 2008 (6 pages).

Xu et al, "Dynamic purity analysis for Java programs", ACM Paste, pp. 75-82, 2007.

Yardimci et al, "Mostly static program partitioning of binary executables", ACM Trans. on Prog.Lang. and Sys. vo. 31, No. 5, article 7, pp. 1-46, 2009.

\* cited by examiner

METHODS AND SYSTEMS FOR PROVIDING FEEDBACK AND SUGGESTED PROGRAMMING METHODS

CROSS-REFERENCE TO RELATED APPLICATIONS

This application claims priority to and the benefit of U.S. provisional patent application Ser. No. 61/601,720, filed on Feb. 22, 2012, the entire disclosure of which is incorporated herein by reference.

FIELD OF THE INVENTION

This invention relates generally to the field of computer programming, and more specifically to the assessment of programming techniques and adherence to programming standards for secure system design and application execution.

BACKGROUND

There are a myriad of testing and assessment techniques for validating various properties of software applications and network implementations. However, one of the most critical processes for ensuring that the deployment of software does not expose an organization to unacceptable risks is security and vulnerability testing. Some of the conventional techniques used to perform such testing includes static analysis (automated code review), dynamic analysis (automated penetration testing) and manual analyses such as code review, design review, and manual penetration testing. All of these analysis techniques are aimed at finding security weaknesses and vulnerabilities in an application and typically provided in report format to the programmers, product managers and quality assurance (QA) staff. The report can provide detailed results (e.g., program names, line numbers, variable names, data connections, etc.) as well as a summary of the results. The report may be a conventional document such as a text file or a structured XML file.

To assist developers in steering clear of many of the well-know pitfalls, system security professionals have developed, over time, a number of best practices. These best practices are typically published as documents, text books, wiki pages or other reference materials. The best practices can include, for example, adherence to certain secure coding standards, use of enhanced-security code libraries, avoidance of code constructs or libraries known to be risky, etc.

There are a number of tools that attempt to identify potential or actual security problems in application code, thus providing "negative feedback" to the developers on suspect and, in some cases, suggesting potential steps to improve the code. However, to date there have not existed any automated mechanisms for explicitly identifying the developer's affirmative use of more-secure best practices, or of providing "positive feedback" to the developer on their coding. As such, developers who implement certain well-designed coding or design techniques may not fully benefit from a comprehensive knowledge base regarding particular best practices.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention

DESCRIPTION OF THE INVENTION

The techniques and supporting systems described herein provide a comprehensive and customizable approach to identifying certain best practices used during the design and development of software applications, as well as recommending additional enhancements or courses of action that may be implemented to further improve the application. As referred to hereinafter, software applications may include (but are not necessarily limited to) any sort of instructions for a machine, including, for example, without limitation, a component, a class, a library, an script, an applet, a logic table, a data block, or any combination or collection of one or more of any one or more of these.

The appropriate type of software security analysis and best practice implementation depends on many factors, including (but not necessarily limited to) the technical details of an application (e.g., the language in which it is written and the platform on which is to be deployed) as well as the business context in which the application operates. For a non-limiting example, an application that is "customer-facing" and facilitates high-volume, secure transactions such as banking or ecommerce will require rigorous testing to ensure that customer data is not jeopardized. Conversely, applications such as document-control systems or desktop applications that are implemented entirely within an organization and operated behind secure firewalls require less stringent testing. Therefore, balancing the added costs for executing additional security assessments and testing with the risks of potential for losses is critical.

Figure 1:
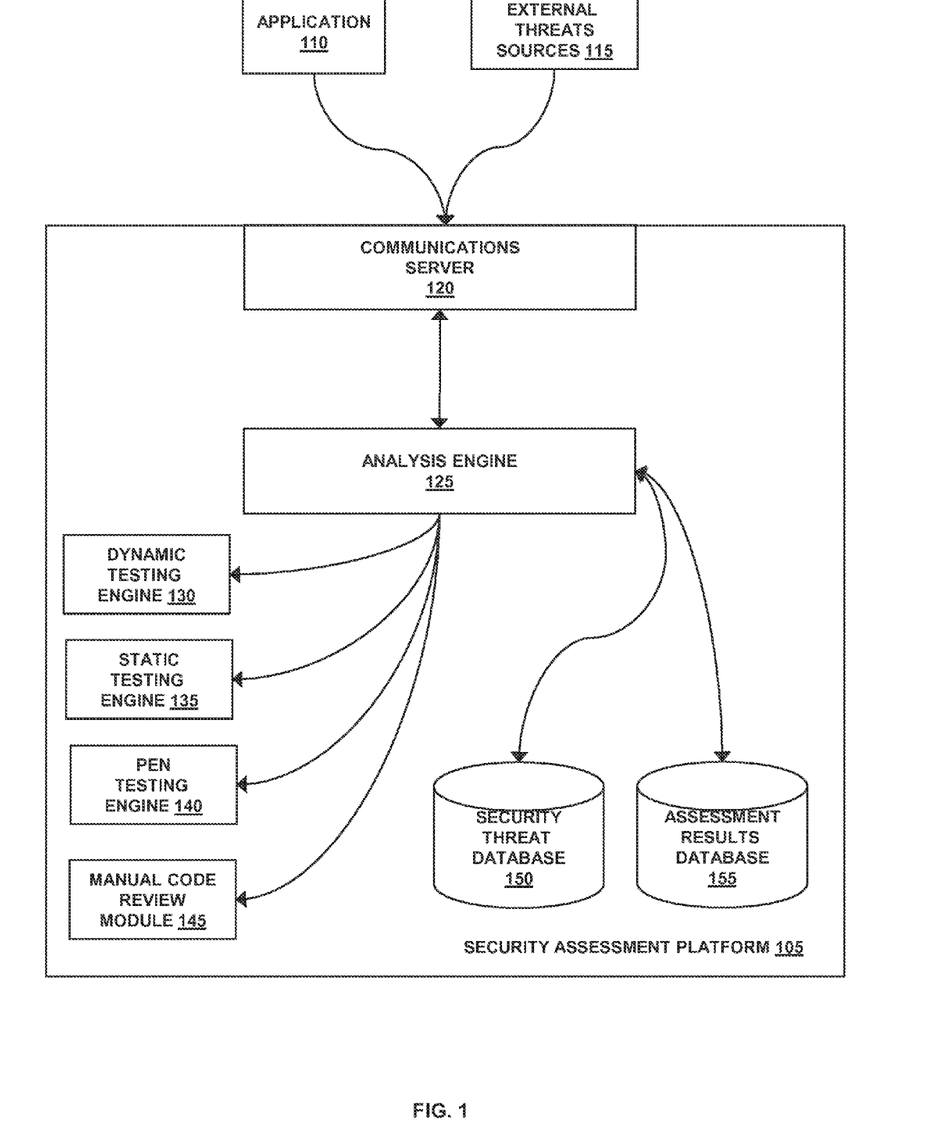
FIG. 1 is a block diagram of a software security assessment platform according to an embodiment of the invention.

FIG. 1 illustrates, in a broad overview, a representative software security assessment platform 105 for implementing the techniques described herein. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the platform 105 receives and reports on software applications 110 from multiple entities, while monitoring numerous sources 115 of external threats for up-to-date libraries of malware and application and environmental vulnerabilities. The platform 105 includes a communications server 120 and an analysis engine 125. As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, the communications server 120 provides the conduit through which the platform interacts with external systems. For a non-limiting example, the communications server 120 may utilize conventional data-communications protocols such as TCP/IP, HTTP and others to query application servers for updated application programs, download updated programs, post analysis results, and send and receive messages from users. More specifically, in a server-based implementation, the communications server 120 may act as an interface between the platform 105 and external entities that submit software applications for assessment or review assessment results. In addition, the communications server 120 may act as a conduit through which other external data such as updated threat information (in the form of malware definition files, for example) are received for storage in the security threat database 150. In some implementations, the security assessment platform 105 may be configured as a distributed platform, in which one or more components (e.g., testing modules, threat-assessment agents, secure communication devices, databases, etc.) are duplicated and/or distributed among multiple computers located remotely from each other but, for example, co-located with users of the platform. Examples of communications server application platforms providing such features include the Apache HTTP Web Server supplied by the Apache Software Foundation and the WebSphere HTTP Server supplied by IBM Corporation.

In the example of FIG. 1, the analysis engine 125 receives application code and programs of a target software application 110 from users, either via the communications server 120 or directly from customers using the platform 105 as a subscription service. In other implementations, the application (or portions of the application) may be received from developers working within a development group, on a development team, or as part of a community of otherwise unrelated programmers. For example, the platform 105 may be implemented within a large organization and used to scan software code as it is developed, checked in to a code repository, and/or put into production. In some cases, the platform 105 may be used as part of a check-in or posting process by a so-called "open soure" project, thus allowing the project administrator to suggest best practice coding techniques to project contributors.

In general, various embodiments of the analysis engine 125 provide a software system and methods of using the system that examine code of the target software application received and identify specific application security best practices that are applicable to the target software application. The analysis engine 125 then identifies locations in the target application's code where the various best practices ought to be implemented and determines for each location whether the relevant best practices appear to have been implemented. At each location, the analysis engine 125 determines to what extent the relevant best practices appear to have been implemented correctly, and to what extent they may be implemented incompletely or incorrectly and provides positive feedback to the developers for what appears to be their correct implementation of best practices.

In some embodiments, the analysis engine 125 interacts with various testing engines and code review modules, as well with assessment and threat databases, and includes benchmarking and reporting capabilities for comparing assessment results among applications, developers, teams and/or organizations.

In one embodiment, for a non-limiting example, the analysis engine 125 interacts with a dynamic testing engine 130, a static testing engine 135, a pen testing engine 140 and a module for performing manual code review 145. In some embodiments, the dynamic analysis engine 130 interacts with the target software application 110 as an external entity and executes the application 110 in a manner that mirrors or emulates the runtime environment in which it operates. In some embodiments, the dynamic analysis engine 130 receives a description of the interfaces to the application 110, sends test and/or simulation data to the application via the interfaces, and analyzes the received responses. The test data may be application-specific (e.g., provided with the application as a library, data file, or structured input) or application-agnostic, such as data and/or scripts known to exploit application vulnerabilities. Based on the responses, the dynamic analysis engine 130 determines whether any security defects exist in the application 110 and the extent to which it may be vulnerable to certain threats. The defects and best practices may be reported in real-time (e.g., via the communications server 120) and/or stored in a database for subsequent analysis and reporting.

In some embodiments, the static analysis engine 135 receives a binary or bytecode version of the target software application 110 as input. For example, a high-level semantic model of the application 10 is created containing control-flow and data-flow graphs of the application 110, and this model then analyzed for the use of best practices and/or quality defects, including security flaws, by a set of analysis scans.

In some embodiments, the pen testing engine 140 performs penetration testing of the application 110. Penetration testing includes, for example, simulating and analyzing various web-based interactions between a client and the server on which the application 110 operates. This includes executing standard HTTP commands such as GET and POST, analyzing FORM elements and scripting elements (both client and server-side), and manipulating inputs to elicit known vulnerabilities.

In some embodiments, the analysis engine 125 may also receive input from manual review processes executed using a manual code review module 145. Manual review processes typically include a human operator visually reviewing source code to determine if proper coding form and standards have been followed, and looking for "extra" functions often left in applications such as trap doors, Easter eggs, and similar undocumented functionality.

In some embodiments, the data, scripts and functions used to identify the best practices and operate the various testing engines and the analysis engine 125 may be stored in a security-threat database 150. The database 150 may be operated as a stand-alone server or as part of the same physical server on which the analysis engine 125 operates. Portions of the threat database 150 may, in some cases, be provided by entities other than the entity operating the platform 105 on a subscription basis, allowing the database 150 to be kept up to date as threats and malware evolve over time. Likewise, the results of each test and the overall analysis process may be stored in an assessment-results database 155. In some embodiments, the applications and analysis results are stored in an encrypted format using a unique key provided to the owner of the analyzed application 110 such that only it can access and review the results of the analysis. In such cases, decryption of the analysis is limited to authorized personnel and all traces of the analysis are deleted from memory (other than the database 155) following completion. Non-limiting examples of database applications that may provide the necessary features and services include the MySQL Database Server by Sun Microsystems, the PostgreSQL Database Server by the PostgreSQL Global Development Group of Berkeley, Calif., or the ORACLE Database Server offered by ORACLE Corp. of Redwood Shores, Calif.

In some embodiments, the examination of the target application by the analysis engine 125 can be done through parsing of the application source code, or the compiled bytecode (as in Java, .NET, and others) or binary executable code (e.g. a compiled C/C++ application). In one non-limiting instantiation, the analysis engine 125 examines the application through a combination of source code and binary code parsing. In addition to parsing the structure of the program, the analysis engine 125 constructs control-flow and data-flow graphs that represent the behavior of the program. These "deep analyses" allow the analysis engine 125 to analyze the intended and actual behavior of even complex, object-oriented programs.

In some embodiments, the analysis engine 125 may identify which best practices might or should apply to a particular target application in a number of ways. In one particular embodiment, the mapping of the best practices that apply to an application may be expressed by the analysis engine 125 as a series of IF-THEN rules, such as "IF the target application communicates with a database, THEN the database security rules apply." The rules may relate to the technical architecture or environment of the application (e.g., the operating system used, the communication protocol(s) used, whether encryption is used, etc.) and/or the business implementation of the application. For a non-limiting example, certain rules may be used to identify good coding practices for consumer-facing financial transaction systems (ecommerce, banking, etc.) whereas others may be used for less risky back office applications such as document management, workflow processing, inventory control, etc. In another embodiment, the use profile of an application (heavy transactional versus content delivery, mobile application etc.) may trigger the application of certain rules. The rules may be applied by the analysis engine 125 in a "forward-chaining" approach, a hierarchical approach, or a multi-path approach such that the applicability of certain rules may be dependant upon the evaluation of other higher-order rules.

Once a set of rules has been identified that apply to a particular application, the analysis engine 125 identifies locations in the target application where the certain best practices might be applied. While there may be numerous methods for identifying the locations, the analysis engine 125 may adopt one method, which uses a series of pattern-matching rules, such as "At every location 'L' in the target application where the target application sends a command string 'S' to a database, and where the command string 'S' could potentially include data from an untrusted source 'U', a best practice dictates that a known-good 'cleanser function' 'F' be applied to the command string 'S' at a point in the dataflow between the untrusted source 'U' and the location 'L' where the command string 'S' is sent to the database. Furthermore, no additional untrusted data, whether from 'U' or otherwise, should be allowed to enter the command string 'S' between when it is cleansed and when it is sent to the database." The above-described application can be modeled as:

Location 'L1':
Code §A. Untrusted data 'U1' enters the system
Code §B . . . . (cleanser function 'F' MUST be applied here) . . . .
Code §C. A database command string 'S' is prepared, including data from 'U1'
Code §D . . . . (NO further untrusted data 'U2' may be allowed to enter 'S')
Code §E. The command string 'S' is sent to the database Based on the results of the evaluation of the rules, the analysis engine 125 can determine whether the relevant best practices appear to have been implemented. Again, the approach depends on the particular best practice in question. Taking the example above, the analysis engine 125 may scan the code of the target software application for the presence of the cleanser function 'F' in the sections of code 'between' (in a data-flow and control-flow sense, not merely in terms of physical code layout) Code §A where the untrusted data 'U1' enters the system, and Code §C where the database command string 'S' is assembled. In this case, the presence of the cleanser function 'F' might indicate that the developer had attempted to implement the relevant "best practice."

To determine to what extent the relevant best practices appear to have been correctly and completely implemented may also depend on the particular best practice in question. Taking the same example above again, the analysis engine 125 scans the code of the target software application for common errors of correctness or completeness, such as (1) additional untrusted data 'U2' being added to the command string 'S', or (2) control flow paths in the target application that cause execution to jump from Code §A to Code §C, therefore bypassing execution of the cleanser function 'F'.

In one embodiment of the methodology, if no implementation errors are detected, the analysis engine 125 flags the implementation of the best practice using a moniker such as P+OK, "apparently present" (P) and "apparently correct" (OK). If implementation errors are detected, the implementation of the best practice may be flagged as P+Err, "apparently present" (P) and "incorrect" (Err), or as P+Inc, "apparently present" (P), and "incomplete" (Inc), or as P+Err+Inc, a combination of incorrect and incomplete implementation. If the wrong best practice for the particular situation appears to have been implemented (e.g., cleanser function 'F1' is required, but cleanser function 'F2' is found instead), the implementation may be flagged as P+Mis, "apparently present", and "mismatched for the situation" (Mis).

Once completed with the scan and analysis, the analysis engine 125 provides positive feedback to developers for apparently complete and correct implementation of a "best practice." Certain locations are flagged as P-OK (implementation apparently present and apparently correct and complete) and communicated to the developers, either as individual locations, or in aggregate, depending on the particular "best practice," the number of instances occurring in the target application, and possibly other factors.

In some embodiments, the analysis engine 125 provides mixed positive and negative feedback to the developers for locations where it appears that the developers attempted to implement a certain best practice, but the implementation of the best practice is either incomplete or incorrect. Reports are provided the analysis engine 125 by identifying locations flagged as P+Err, P+Inc, P+Err+Inc, or P+Mis to the developers, either as individual locations or in aggregate, depending on the particular best practice, the number of instances occurring in the target application, and possibly other factors. In effect, this informs the developer that they have used correct security and coding practices but the code needs additional work to implement these features in a manner that they have their full and intended effect.

Reporting to the developer may take many forms. As one non-limiting example, the results may be reported in separate documents, emails, web pages, or other messages to the developer. In some cases, however, the report may take the form of visual indicators added into the developer's development environment such as green indicators or icons next to the lines of code where a best practice has been completely and accurately utilized, or shading the background of the "good" code light green. Other colors (yellow, red, etc.) may be used to indicate or highlight code that used the best practices but needs additional attention, or places where no attempt was made to implement the best practices.

So as not to generate a surfeit of gratuitous positive feedback, and thus dilute the value of a small amount of well-deserved positive feedback, the analysis engine 125 may explicitly excludes several particular situations. In particular, the analysis engine 125 may not give positive feedback in situations where there is no need for implementation of a best practice. If there is no actual security threat in a particular area of the code, there is no feedback given there, regardless of what the developer has implemented.

Figure 2:
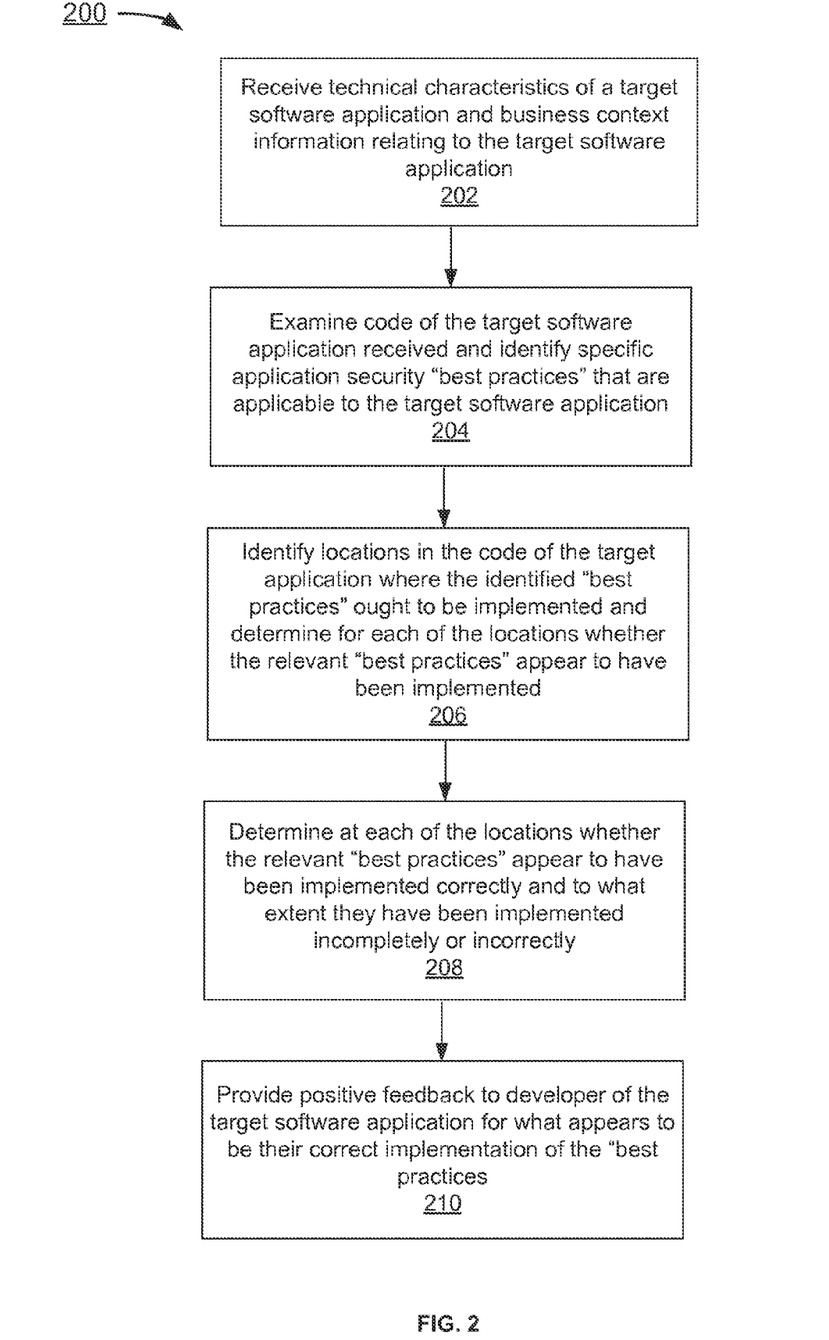
FIG. 2 is a flow chart depicting steps performed in software security analysis according to an embodiment of the invention.

FIG. 2 is a flowchart illustrating a process 400 to implement and support software security analysis. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202 where technical characteristics of a target software application and business context information relating to the target software application are received. The flowchart 200 continues to block 204 where code of the target software application received is examined and specific application security best practices that apply to the target software application are identified. The flowchart 200 continues to block 206 where locations in the code of the target application where the identified best practices ought to be implemented are identified and whether the relevant best practices appear to have been implemented is determined for each of the locations. The flowchart 200 continues to block 208 where whether the relevant best practices appear to have been implemented correctly and to what extent they have been implemented incompletely or incorrectly are determined at each of the locations. The flowchart 200 ends at block 210 where positive feedback for what appears to be their correct implementation of the best practices are provided to developer of the target software application.

Using various embodiments, the analysis engine 125 may "package" or "bound" the security analysis and vulnerability testing results to the actual software they describe. As used herein, "software" may refer to a single program, a component, a page of mark-up language (e.g., HTML), a server instance (either actual or virtual), a script, a collection of programs, or an entire application. In some cases, the software may be a commercially-available product delivered via traditional methods such as CD-ROM or download, whereas in other cases the software may be a website or collection of websites that provide the software and/or services over the Internet, commonly referred to as software as a service, or "SaaS". In still other cases, software may refer to a collective of otherwise unrelated applications and services available over the internet, each performing separate functions for one or more enterprises, (i.e., "cloud" computing). By linking the report to the software itself, downstream users of the software can access information about the software, make informed decisions about implementation of the software, and analyze the security risk across an entire system by accessing all (or most) of the reports associated with the executables running on the system and summarizing the risks identified in the reports.

The methods and techniques describe above may be implemented in hardware and/or software and realized as a system for producing, storing, retrieving and analyzing security and vulnerability reports for software applications. For example, the platform 105 may be implemented as a collection of data processing modules for ingesting, reviewing, and attacking software applications, a module for producing the security report, and a data storage appliance (or series of appliances) to store the reports. The platform 105 may in some cases also include a digital rights management module that creates, certifies and confirms hash values, secure keys, and other user and use-based restrictive elements that ensure the authenticity of the users and that the reports are bound to the correct software components. In some embodiments the module may set aside portions of a computer as random access memory to provide control logic that affects the processes described above. In such an embodiment, the program may be written in any one of a number of high-level languages, such as FORTRAN, PASCAL, C, C++, C#, Java, Tcl, or BASIC. Further, the program can be written in a script, macro, or functionality embedded in commercially available software, such as EXCEL or VISUAL BASIC. Additionally, the software could be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, a computer-readable program means such as a floppy disk, a hard disk, an optical disk, a magnetic tape, a PROM, an EPROM, or CD-ROM, appliances, partitions (either physical or virtual) of single appliances, or combinations of the two.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A software security assessment platform, comprising:
   a communications server, which in operation, receives technical characteristics of a target software application and business context information relating to the target software application;
   an analysis engine, which in operation:
   examines code of the target software application received and generates a model of the software application, the model containing control-flow and data-flow graphs of the software application;
   identifies specific application security best practices that are applicable to the target software application;
   identifies locations in the code of the target application, the locations being based on, at least in part, the control and data flow of the code contained in the model, and the locations indicating where code segments according to the identified best practices ought to be implemented, and
   determines for each of the locations whether the code segments according to the relevant best practices appear to have been implemented;
   determines at each of the locations whether the relevant best practices appear to have been implemented correctly and to what extent they have been implemented incompletely or incorrectly; and
   provides mixed positive and negative feedback to a developer for locations where it appears that the developer attempted to implement a certain best practice, and the implementation is correct, incomplete, or incorrect, excluding at least one location where a best practice is attempted but need not be implemented.

2. The platform of claim 1 further comprising a dynamic analysis engine that executes the target software application in a manner that mirrors or emulates the runtime environment in which it operates.

3. The platform of claim 1 further comprising a static analysis engine that receives a binary or bytecode version of the target software application as input and creates a high-level semantic model of the application containing control-flow and data-flow graphs of the application for analysis.

4. The platform of claim 1 further comprising a pen testing engine that performs penetration testing of the target software application.

5. The platform of claim 1 further comprising a manual code review module that receives input from manual review processes including a human operator visually reviewing the code of the target software application to determine if proper coding form and standards have been followed, and looking for "extra" functions often left in the application.

6. The platform of claim 1 further comprising a benchmarking and reporting module that compares assessment results among applications, developers, teams and/or organizations.

7. The platform of claim 1 further comprising a digital rights management engine that applies a digital rights management process against application assessment input data, thereby limiting distribution and use of the vulnerability test results to specified users.

8. The platform of claim 1 wherein the analysis engine provides mixed positive and negative feedback to the developers for locations where it appears that the developers attempted to implement a certain best practice, but the implementation is incomplete or incorrect.

9. The platform of claim 1 wherein the analysis engine examines the target software application through parsing of one or more of the source code, the compiled bytecode, and binary executable code of the target software application.

10. The platform of claim 1 wherein the analysis engine maps the best practices that are applicable to the target software application as a series of IF-THEN rules, wherein the rules are applied in a "forward-chaining" approach, a hierarchical approach, or a multi-path approach such that the applicability of certain rules is dependent upon the evaluation of other higher-order rules.

11. The platform of claim 1 wherein the analysis engine identifies locations in the code of the target application where the identified best practices ought to be implemented by using a series of pattern-matching rules.

12. The platform of claim 1 wherein the analysis engine determines at each of the locations whether the relevant best practices appear to have been implemented by scanning the code of the target software application for the presence of cleanser functions.

13. The platform of claim 1 wherein the analysis engine determines at each of the locations to what extent the relevant best practices have been implemented incompletely or incorrectly by scanning the code of the target software application for common errors of correctness or completeness.

14. The platform of claim 1 wherein the analysis engine provides positive feedback to developers of the target software application by flagging the implementation of the best practices based on whether or not implementation errors are detected.

15. The platform of claim 1 wherein the analysis engine provides mixed positive and negative feedback to the developers for locations where it appears that the developers attempted to implement a certain best practice, but the implementation of the best practice is either incomplete or incorrect.

16. The platform of claim 1 wherein the analysis engine does not provide positive feedback in situations where there is no need for implementation of a "best practice".

17. The platform of claim 1 wherein the analysis engine does not provide any feedback if there is no actual security threat in a particular area of the code regardless of what the developer has implemented.

18. A method for software security assessment, comprising:
   receiving technical characteristics of a target software application and business context information relating to the target software application;
   examining code of the target software application received and generating a model of the software application, the model containing control-flow and data-flow graphs of the software application;
   identifying locations in the code of the target application, the locations being based on, at least in part, the control and data flow of the code contained in the model, and the locations indicating where code segments according to the identified best practices ought to be implemented and
   determining for each of the locations whether the code segment according to the relevant best practices appear to have been implemented;
   determining at each of the locations whether the relevant best practices appear to have been implemented correctly and to what extent they have been implemented incompletely or incorrectly; and
   providing mixed positive and negative feedback to a developer for locations where it appears that the developer attempted to implement a certain best practice, and the implementation is correct, incomplete, or incorrect, excluding at least one location where a best practice is attempted but need not be implemented.

19. The method of claim 18 further comprising executing the target software application in a manner that mirrors or emulates the runtime environment in which it operates.

20. The method of claim 18 further comprising receiving a binary or bytecode version of the target software application as input and creating a high-level semantic model of the application containing control-flow and data-flow graphs of the application for analysis.

21. The method of claim 18 further comprising performing penetration testing of the target software application.

22. The method of claim 18 further comprising receiving input from manual review processes including a human operator visually reviewing the code of the target software application to determine if proper coding form and standards have been followed, and looking for "extra" functions often left in the application.

23. The method of claim 18 further comprising comparing assessment results among applications, developers, teams and/or organizations.

24. The method of claim 18 further comprising applying a digital rights management process against application assessment input data, thereby limiting distribution and use of the vulnerability test results to specified users.

25. The method of claim 18 further comprising providing mixed positive and negative feedback to the developers for locations where it appears that the developers attempted to implement a certain best practice, but the implementation is incomplete or incorrect.

26. The method of claim 18 further comprising examining the target software application through parsing of one or more of the source code, the compiled bytecode, and binary executable code of the target software application.

27. The method of claim 18 further comprising mapping the best practices that are applicable to the target software application as a series of IF-THEN rules, wherein the rules are applied in a "forward-chaining" approach, a hierarchical approach, or a multi-path approach such that the applicability of certain rules is dependent upon the evaluation of other higher-order rules.

28. The method of claim 18 further comprising identifying locations in the code of the target application where the identified best practices ought to be implemented by using a series of pattern-matching rules.

29. The method of claim 18 further comprising determining at each of the locations whether the relevant best practices appear to have been implemented by scanning the code of the target software application for the presence of cleanser functions.

30. The method of claim 18 further comprising determining at each of the locations to what extent the relevant best practices have been implemented incompletely or incorrectly by scanning the code of the target software application for common errors of correctness or completeness.

31. The method of claim 18 further comprising providing positive feedback to developers of the target software application by flagging the implementation of the best practices based on whether or not implementation errors are detected.

32. The method of claim 18 further comprising providing mixed positive and negative feedback to the developers for locations where it appears that the developers attempted to implement a certain best practice, but the implementation of the best practice is either incomplete or incorrect.

33. The method of claim 18 further comprising not providing positive feedback in situations where there is no need for implementation of a "best practice".

34. The method of claim 18 further comprising not providing any feedback if there is no actual security threat in a particular area of the code regardless of what the developer has implemented.

* * * * *